US009559782B2

United States Patent
Koebele et al.

(10) Patent No.: US 9,559,782 B2
(45) Date of Patent: Jan. 31, 2017

(54) OPTICAL RECEIVER FOR MULTIMODE COMMUNICATIONS

(75) Inventors: Clemens Koebele, March (DE); Massimiliano Salsi, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 358 days.

(21) Appl. No.: 14/114,400

(22) PCT Filed: Apr. 17, 2012

(86) PCT No.: PCT/EP2012/057004
§ 371 (c)(1),
(2), (4) Date: Jan. 21, 2014

(87) PCT Pub. No.: WO2012/150127
PCT Pub. Date: Nov. 8, 2012

(65) Prior Publication Data
US 2014/0126588 A1 May 8, 2014

(30) Foreign Application Priority Data

May 4, 2011 (EP) ..................................... 11164706

(51) Int. Cl.
*H04B 10/61* (2013.01)
*H04B 10/2581* (2013.01)
*H04J 14/04* (2006.01)

(52) U.S. Cl.
CPC ........ *H04B 10/616* (2013.01); *H04B 10/2581* (2013.01); *H04J 14/04* (2013.01)

(58) Field of Classification Search
None
See application file for complete search history.

(56) References Cited

U.S. PATENT DOCUMENTS

| 3,761,716 A | 9/1973 | Kapron et al. |
| 2002/0085251 A1* | 7/2002 | Ofek ................... H04L 12/6418 398/55 |

(Continued)

FOREIGN PATENT DOCUMENTS

| CN | 1914836 | 2/2007 |
| CN | 1933374 | 3/2007 |

(Continued)

*Primary Examiner* — Huy D Vu
*Assistant Examiner* — James P Duffy
(74) *Attorney, Agent, or Firm* — Patti & Malvone Law Group, LLC

(57) ABSTRACT

An optical receiver (20) for multimode communications comprises:
a mode demultiplexer (21) having an input connected to a multimode link (22) and a plurality of output lines (231-234), wherein the mode demultiplexer is adapted to couple each of the modal components of the optical signal substantially into a selected one of the output lines,
a plurality of coherent optical detectors (251-254) respectively connected to the output lines to produce a set of electrical digital signals each comprising an in-phase component and a quadrature-phase component,
a plurality of independently adjustable optical delay devices (241-244) arranged on the output lines to impart a selected delay to each of the corresponding modal components, and
a signal processing device (26) adapted to process the digital signals to recover the independent modulations of the respective modal components by inverting a mode-mixing characteristic of the multimode link.

20 Claims, 2 Drawing Sheets

(56) References Cited

U.S. PATENT DOCUMENTS

| | | | | |
|---|---|---|---|---|
| 2004/0096222 A1* | 5/2004 | Cagenius | ......... | H04B 10/25758 |
| | | | | 398/115 |
| 2004/0208623 A1* | 10/2004 | Kumar | ................... | H04J 14/08 |
| | | | | 398/161 |
| 2010/0329671 A1 | 12/2010 | Essiambre et al. | | |
| 2011/0206375 A1* | 8/2011 | Xiong | ............... | H04B 10/5165 |
| | | | | 398/65 |

FOREIGN PATENT DOCUMENTS

| | | |
|---|---|---|
| CN | 101120526 | 2/2008 |
| WO | 2010151484 | 12/2010 |

\* cited by examiner

OPTICAL RECEIVER FOR MULTIMODE COMMUNICATIONS

FIELD OF THE INVENTION

The invention relates to the technical field of optical communication systems employing waveguides supporting more than one propagation mode, in particular to optical receivers suitable for such systems.

BACKGROUND

A potential disruptive solution to further increase capacity in long-range optical transmission systems is to exploit more than one spatial propagation mode in optical fibers. Such mode division multiplexing enables for multiple-input multiple-output (MIMO) transmission. WO-A-2010/151432 discloses examples of such an optical multimode transmission system. In optical multimode transmission systems, the different spatial modes have different propagation constants and arrive with a time delay at the receiver side. This delay is a function of the transmission distance and the differential mode group delay (DMGD). In long-range applications, such delay is likely to exceed a processing depth capability of conventional digital signal processors.

SUMMARY

In an embodiment, the invention provides an optical receiver for multimode communications, comprising:

a mode demultiplexer having an input connected to a multimode link and a plurality of output lines, wherein the multimode link is adapted to propagate an optical signal comprising a plurality of modal components that have been independently modulated at a remote point of the multimode link, wherein the mode demultiplexer is adapted to couple each of the modal components of the optical signal substantially into a selected one of the output lines, a plurality of coherent optical detectors respectively connected to the output lines to produce a set of electrical digital signals each comprising an in-phase component and a quadrature-phase component, a plurality of independently adjustable optical delay devices arranged on the output lines to impart a selected delay to each of the corresponding modal components, and a signal processing device adapted to process the digital signals to recover the independent modulations of the respective modal components by inverting a mode-mixing characteristic of the multimode link.

According to embodiments, such a receiver device can comprise one or more of the features below.

In an embodiment, an adjustable optical delay device comprises a delay module including a set of optical fibers having respective lengths connected in parallel and an optical switch adapted to pass the optical signal propagating in the output line to a selected one of the optical fibers connected in parallel.

In an embodiment, the lengths of the fibers in the first set are successive integer multiples of a reference length.

In an embodiment, the reference length substantially corresponds to a maximum processing depth of the signal processing device.

In an embodiment, the adjustable optical delay device further comprises a second delay module including a second set of optical fibers having respective lengths connected in parallel and a second optical switch adapted to pass the optical signal coming from the first delay module to a selected one of the optical fibers connected in parallel, wherein the lengths of the fibers in the second set are equal to the lengths of the fibers in the first set times an integer multiplier.

In an embodiment, the integer multiplier is substantially equal to a number of fibers in the first set.

In an embodiment, the output lines and optical delay devices comprise single-mode optical fibers.

In an embodiment, the optical receiver further comprises a delay control module for adjusting the adjustable optical delay devices, wherein the delay control module is capable of:

determining a coarse compensation delay for each of the modal components of the optical signal as a function of delay data relating to a differential mode delay between the modal component and a reference and length data relating to a length of optical fiber used in the multimode link, and adjusting the adjustable optical delay device corresponding to the modal component as a function of the coarse compensation delay determined for the modal component.

In an embodiment, the coarse compensation delay compensates a difference between the propagation time of the modal component and the propagation time of the reference.

In an embodiment, the delay control module is further capable of retrieving the delay data and length data from a data repository.

In an embodiment, the data repository comprises length data and delay data corresponding to a plurality of links of an optical network in which the optical receiver is installed, wherein the delay control module is capable of retrieving the delay data and length data as a function of a link identifier of the multimode link.

In an embodiment, the delay control module is capable of:

determining a residual delay for each of the modal components of the optical signal at the coherent optical detectors, and adjusting the adjustable optical delay device corresponding to the modal component as a function of the residual delay determined for the modal component.

In an embodiment, the determining of a residual delay comprises optimizing a cross-correlation function between a digital stream recovered from the modal component and a digital stream recovered from another modal component, wherein both modal components were originally modulated with a same learning sequence.

In an embodiment, the delay control module is further capable of determining updated delay data for the modal component as a function of the residual delay and uploading the updated delay data into a data repository.

In an embodiment, the signal processing device comprises a respective adjustable digital delay line associated to each digital signal component for imparting an adjustable delay to the digital signal component, wherein the delay control module is further capable of adjusting the adjustable digital delay line associated to a digital signal component as a function of the residual delay determined for the corresponding modal component.

Aspects of the invention stem from the observation that the differential mode group delay (DMGD) of low-order modes in an optical fiber, for example modes LP01, LP02, and LP11, may be about 6.1 ps/nm, 0.73 ps/nm and 0.5 ps/nm with reference to a fundamental mode. After a transmission distance of 1000 km, a mode delay of about 6.1 µs, 0.73 µs and 0.5 µs is accumulated. For very high speed transmissions, e.g. with PDM-QPSK modulation at 100 Gb/s, the accumulated delay corresponds to 170,800 symbols, 20,440 symbols and 14,000 symbols respectively. Such huge values cannot be compensated in a conventional digital signal processing unit.

Aspects of the invention stem from the observation that lumped linear mode coupling can be induced in multimode communication systems by nonlinear phenomena in optical fibers as well as non-ideal behavior of modal multiplexers and demultiplexers employed. Therefore, joint digital signal processing is needed for equalization to mitigate the resulting impairments i.e. crosstalk between modes. However, joint digital signal processing in a DSP cannot achieve equalization when signal delays exceed largely the available processing depth of the DSP.

The invention is based on the idea of using an optical DMGD compensator for compensating the differential mode group delay at least to the extent that exceeds the capability of a digital FIR equalizer. Aspects of the invention are based on the idea of compensating DMGD at several layers in an optical receiver, e.g. at an optical layer and an electronic layer.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
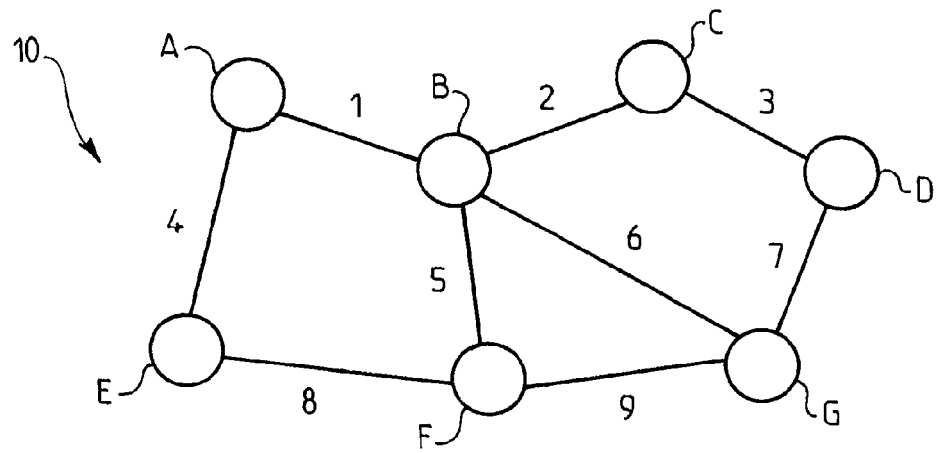
FIG. 1 is a functional representation of an optical communications network in which embodiments of the invention can be used.

FIG. 1 is a schematic representation of an optical network 10 comprising a plurality of nodes A to G and a plurality of multimode optical links 1-9 interconnecting the nodes A-G. The multimode optical links 1-9 are made of waveguides that support multiple modes in the carrier frequency range used, e.g. Multimode fibers (MMF) or few-mode fibers (FMF). FMF as used herein refers to fibers having up to 10 transverse modes in the carrier frequency range of interest. The number of nodes, number of links and the topology shown are purely illustrative.

Spatial mode division multiplexing is a technique that can be used in network 10 to transmit multiple modulated optical signals over a same optical fiber between adjacent or non-adjacent nodes. For that purpose, a mode multiplexer is employed at one end of the optical communication path, to couple the multiple modulated optical signals to respective spatial modes of the optical fiber. Conversely, a mode demultiplexer is employed at the other end of the communication path, to couple the multiple spatial modes propagated through the optical communication path to respective outputs. However, due to intermodal cross-talk during propagation, such mode demultiplexer may not be sufficient to recover the original modulated signals with sufficient quality for decoding.

Figure 2:
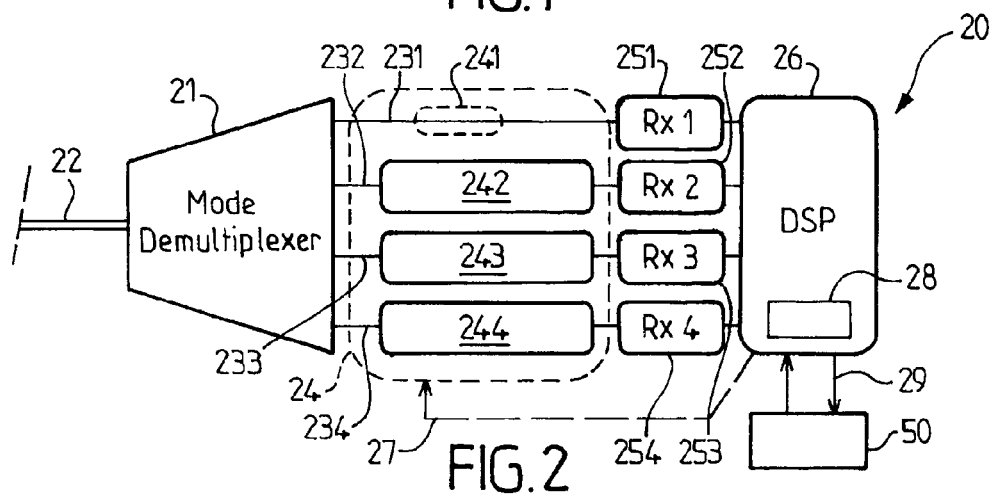
FIG. 2 is a functional representation of an optical receiver in accordance with an embodiment.

With reference to FIG. 2, an optical receiver arrangement 20 which can be used to improve the reception of optical signals transmitted with spatial mode division multiplexing will now be described.

The optical receiver arrangement 20 comprises an optical mode demultiplexer 21, which includes an input connected to a multimode optical link 22 through which the signals to be decoded are received and a plurality of outputs connected to respective single-mode optical fibers 231 to 234. The optical mode demultiplexer 21 operates to couple each of the modal components of the multimode optical signal received through the multimode optical link 22 selectively into a respective one of the fibers 231 to 234. Four spatial modes can be separated in that way in the illustrative embodiment of FIG. 2. "Selectively into one of the fibers 231 to 234" means that a single-mode fiber at the output of mode demultiplexer 21 receives energy that comes predominantly (e.g. at more than 90%) from one of the optical modes of the multimode link 22. The optical signals propagating in the output fibers 231 to 234 will be called "modal signals" in the following description.

Each output fiber 231 to 234 comprises an independently adjustable delay line 241 to 244 to delay the respective modal signals by a respective delay. The delays of delay lines 241 to 244 are set as a function of the differential mode group delays (DMGD) of the respective spatial modes so as to compensate for the delays that occurred during propagation within the multimode link between the mode multiplexer at one end of the optical path and the mode demultiplexer at the other end of the optical path. Delay lines 241 to 244 are collectively designated as an optical DMDG compensator 24 in the following description.

Delay line 241 shown in dotted line may be suppressed in an embodiment since the signal propagated on the slowest mode need not be further delayed in the optical receiver arrangement 20. Namely, the delay lines 242 to 244 can be set to delay the respective modal signals that they receive by an amount adapted to recover substantial synchronization with the slowest mode that was used for communication, which is coupled into output fiber 231.

A respective coherent receiver 251 to 254 is connected to each output fiber 231 to 234 to convert the respective modal signals into electric signals. The coherent receivers 251 to 254 each produce an in-phase signal and a quadrature-phase signal to represent both the amplitude and phase of the modal signal being detected. Analog-to-digital converters not shown are also provided to feed the respective electrical signals to a digital signal processor 26.

In an embodiment suitable for communication with polarization-division multiplexing (PDM), each coherent receiver detects separately two polarized components of the modal signal, so that 4 electrical signals are produced from a single modal signal. Coherent receivers for PDM are well-known in the art.

The digital signal processor 26 operates to equalize the electrical signals and decode the data that was originally modulated onto the respective modal components. Especially, signal processing in DSP 26 serves to compensate residual chromatic dispersion and residual DMGD that may remain behind the optical DMGD compensator 24. Adjustable buffers and FIR filters may be used for that purpose. However, the amount of compensation that buffers and FIR filter can provide is limited by the number of taps, which cannot grow indefinitely due to hardware limitations. As a consequence, the settings of optical DMDG compensator 24 should by precise enough, so that the amount of residual DMGD remains manageable by the DSP.

In the embodiment of FIG. 2, two layers of DMGD compensation are implemented:

The DSP layer can precisely compensate delays from less than one symbol period T up to roughly 1000·T.

The optical DMDG compensator 24 in the optical receiver arrangement 20 can compensate delays in steps S of about 1000·T from 0 S up to 256 S or 1024·S.

Figure 3:
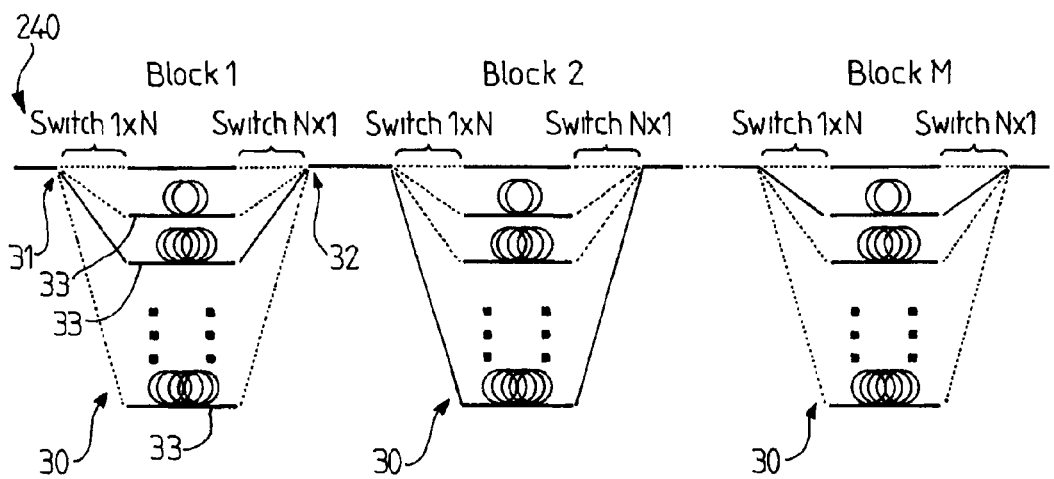
FIG. 3 is a functional representation of an adjustable delay device which can be used in the optical receiver of FIG. 2.

With reference to FIG. 3, an embodiment of an adjustable delay line 240 suitable for implementing the optical DMDG compensator 24 will now be described.

The adjustable delay line 240 of FIG. 3 comprises a chain of M blocks 30. Each block 30 contains a couple of a 1×N switch 31 and a N×1 switch 32 connecting N spools 33 of single-mode optical fiber with different lengths. M and N refer to integer numbers, the value of which can be selected in accordance with implementation requirements.

For the sake of illustration, the following numerical values can be chosen in an embodiment. The unitary compensable delay S, e.g. S=1000 T, translates into about 33 ns for a symbol rate of 32 GBaud. As a consequence, the unitary SMF length required for compensating S is L=6.25 m. As an example, table 1 shows the respective SMF lengths for an embodiment with M=4 blocks each comprising N=4 spools of fiber 33.

In this embodiment, the 4×4 delay line 240 can be selectively configured to form 256 segments of fiber having lengths ranging from 0 to 1593.75 m by increments equal to L. The maximum compensating delay is Dmax=7968 ns. This delay is the typical delay of a worst case scenario after more than 900 km of multimode propagation.

Referring back to FIG. 2, the DSP 26 may be designed with a capability of automatically configuring the optical DMGD compensator 24, as shown by arrow 27. For that purpose, in an embodiment, DSP 26 comprises a delay control module 28 that estimates the DMGD of each modal signal as a function of the physical parameters of the optical path (length and fiber type) and the physical parameters of the modal component (group velocity) and adjusts each delay line as a function of the estimated delay. The corresponding physical parameters can be stored in a database 50 from which they are retrieved by the delay control module 28 as needed.

In an embodiment, the database 50 comprises a look-up table including static delay information. The look-up table may contain the following information:

Span lengths for each link,

Identification of exploitable modes over each span, and

Mode delay values for each mode over each span.

Table 2 illustrates a possible implementation of such a look-up table for the case of network 10. Spans are identified by a span index shown on FIG. 1 and in the first column of Table 2. The physical data is Table 2 can be initialized by filling in theoretical values obtained from fiber manufacturers and/or from experimental characterization.

Using this data, the respective delays between modal signals received in receiver arrangement 20 can be computed by the delay control module 28 based on prior knowledge of the optical path through the network. Such knowledge can be obtained thanks to control plane mechanisms, e.g. retrieved from GMPLS traffic engineering databases comprising LSP data. The principles of such computation will become more apparent with the following illustrative examples.

Example 1 two modulated optical signals are transmitted over two modes LP01 and LP11 from node A to node G. Both modes are propagated through spans 1 and 6 in this order. The resulting delay between the two modes is (see Table 2):

(50*4.25+80*2.5)=412.5 ns.

Example 2 three modulated optical signals are transmitted over three modes LP01, LP11 and LP02 from node A to node G. All modes are propagated through spans 1, 5 and 9 in this order, because the route through span 6 is not available, e.g. span 6 does not support mode LP02.

The resulting delay for LP11 is (see Table 2):

(50*4.25+50*4.25+60*4.22)=678.2 ns

The resulting delay for LP02 is (see Table 2):

(50*6.32+50*6.28+60*6.31)=10008.6 ns

In an embodiment, delay control module 28 is also capable of performing an update function for updating the look-up table in database 50, as shown by arrow 29. The data in Table 2 can be updated by several methods.

In an embodiment, the DSP 26 determines the physical parameters with an algorithm, upon receiving training sequences known in advance. Arbitrary modulation formats can be used for that purpose. Such an update using data-aided algorithm is performed from time to time, e.g. once per week or once per month depending on the time-scale of fluctuations of concerned parameters.

As an example for a suitable data-aided algorithm, the DSP 26 can proceed as follows: while several instances of a same training sequence are transmitted simultaneously over one multimode span using different propagation modes, the DSP 26 varies the applied optical delays in DMGD compensator 24 until a cross-correlation function between the corresponding decoded sequences is optimized, i.e. a maximum correlation is obtained.

While the above-solutions can be used as a basis for compensating static or quasi-static propagation delays to a sufficient extent that every modal signal can be detected and decoded individually, the DSP 26 can be further enhanced to perform a fine tuning by adaptive, blind, real-time algorithm to improve performance.

It is observed that DMGD fluctuations around statically determined values should remain very small during short time frames. For illustration, the amplitude of fluctuations can be estimated as follows. Chromatic dispersion fluctuates by about 0.005 ps/nm/km in one second, i.e. 10 ps/nm over 2000 km, for a typical 20 ps/nm/km chromatic dispersion value of the fiber, i.e. a fluctuation by ¼000 of the total dispersion value.

For a DMGD value of about 5 ns/km; the same fluctuation ratio of ¼000 leads to 1.25 ps/km for fluctuation amplitude. At 28 Gbaud, this corresponds to about 1 symbol every 20-30 km of fiber. Since a maximum transmission distance in submarine is about 12,000 km, a maximal fluctuation range corresponding to that distance is up to about 600 symbols.

To compensate a DMGD fluctuation of such amplitude, an adaptive algorithm may be performed by the DSP 26. The adaptive algorithm may be based on the following principles:

While signals transmitted over different modes are normally independent at the transmitter side in accordance with the principle of mode division multiplexing, delay compensation at the receiver side should compensate cross-talk between modes in both directions. Cross-talk leads to one modal signal making a "footprint" on another modal signal, so that modal signals get correlated.

The adaptive algorithm operates to maximize a cross-correlation function between two modes while varying a compensation delay around the coarse delay value found in the look-up table.

For example, the adaptive algorithm operates to maximize the following function over a block of data of length T:

$$(s_{LP_{mn}} * s_{LP_{kl}})(t) = \int_0^T s_{LP_{mn}} * (\tau) s_{LP_{kl}}(t + \tau) d\tau \quad (1)$$

In Equation (1):

$s_{LPnm}$ and $s_{LPkl}$ designate incoming modal signals corresponding to modes $LP_{mn}$ and $LP_{kl}$, already corrected by the DMGD compensator 24 which was initially set at the coarse value determined through look-up table, and The value of variable t at the maximum of the cross-correlation function corresponds to the optimized delay.

As mentioned, the delays imparted by optical DMGD compensator 24 can be adjusted by a unitary compensation delay, which may be high enough. The impart finer compensation delays between the modal signals downstream of optical DMGD compensator 24, the DSP 26 may further comprise adjustable electronic buffers for each detected signal. Such buffers can be operated as an adjustable digital DMGD compensator in order to finely recover for residual DMGD between modal signals. Embodiments of digital signal processing devices comprising such a digital DMGD compensator will now be described with reference to FIGS. 4 and 5.

Figure 4:
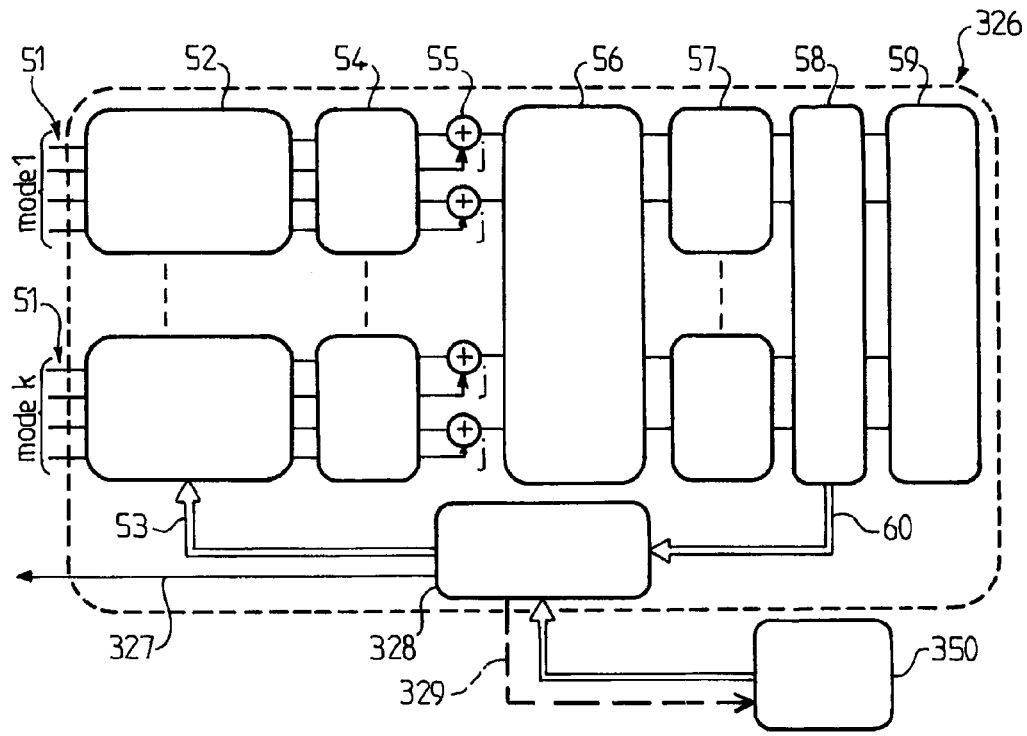
FIG. 4 is a functional representation of a signal processing unit which can be used in the optical receiver of FIG. 2 in accordance with an embodiment.

With reference to FIG. 4, elements that are identical or similar the elements of FIG. 2 are designated by the same numeral increased by 300.

The digital signal processor 326 comprises a four-line input 51 for each detected modal signal, which is suitable for receiving the in-phase component and quadrature-phase component of both polarization components of a PDM modulated signal. The four-line input 51 is connected to an adjustable digital DMGD compensator 52 made of digital buffers and controlled by a DMGD computation module 328, as shown by arrow 53. The adjustable digital DMGD compensator 52 is connected to a chromatic dispersion (CD) compensation block 54, which can be implemented as a static or adaptive FIR filter. Adder blocks 55 at the output of CD compensation block 54 operate to reconstitute two complex digital signals corresponding to each polarization component of the modal signal being processed and feed the complex signals to a MIMO module 56.

MIMO module 56 operates to equalize and separate the modal signals (and polarized components thereof in case of PDM transmissions) in the digital domain by inverting a mode-mixing matrix of the optical path. It can be implemented as a set of adaptive FIR filters using blind adaptation algorithms such as the constant module algorithm (CMA).

Downstream of MIMO module 56, the processing chain comprises Carrier Frequency and Phase estimation modules 57 for recovering the frequency and phase of the carrier wave, DMGD estimation block 58 for estimating the residual DMGD that was not compensated by optical compensator 24 and digital compensator 52 and symbol identification block 59 for decoding the data streams, including FEC decoding as the case may be.

DMGD estimation block 58 operates by computing and optimizing cross-correlation functions between signals as mentioned above, so as to obtain a real-time estimate 60 of the deviation of actual DMGD versus the compensation values set in optical compensator 24 and digital compensator 52. DMGD computation module 328 uses this estimate to set updated compensation delays in digital compensator 52 and optical compensator 24, as shown by arrows 53 and 327.

In an embodiment, the settings of optical compensator 24 are only modified for relatively large modifications of the compensation delays, whereas finer modifications can be imparted to digital compensator 52. In another embodiment, digital compensator 52 is suppressed and finer delay compensations are performed directly by MIMO module 56 using a high number of filter taps.

DMGD computation module 328 may use the estimate 60 to update physical parameters of the optical path in database 350, as shown by arrow 329. In an embodiment, such an update is uploaded only when operating in a learning mode, i.e. with training sequences.

In another embodiment, an update is also uploaded during normal exploitation. FEC information such as pre-FEC Bit-error rate and frame synchronism can be used for that purpose i.e. to directly calculate the delay between the different signals on different modes in case a complete data stream is detected. Nevertheless, the look-up table in database 350 cannot be updated at a very high rate. This table should rather list average values and should not follow the high frequency fluctuations. The fluctuations can be compensated at the receiver side in real-time through the digital DMGD compensator 52.

Figure 5:
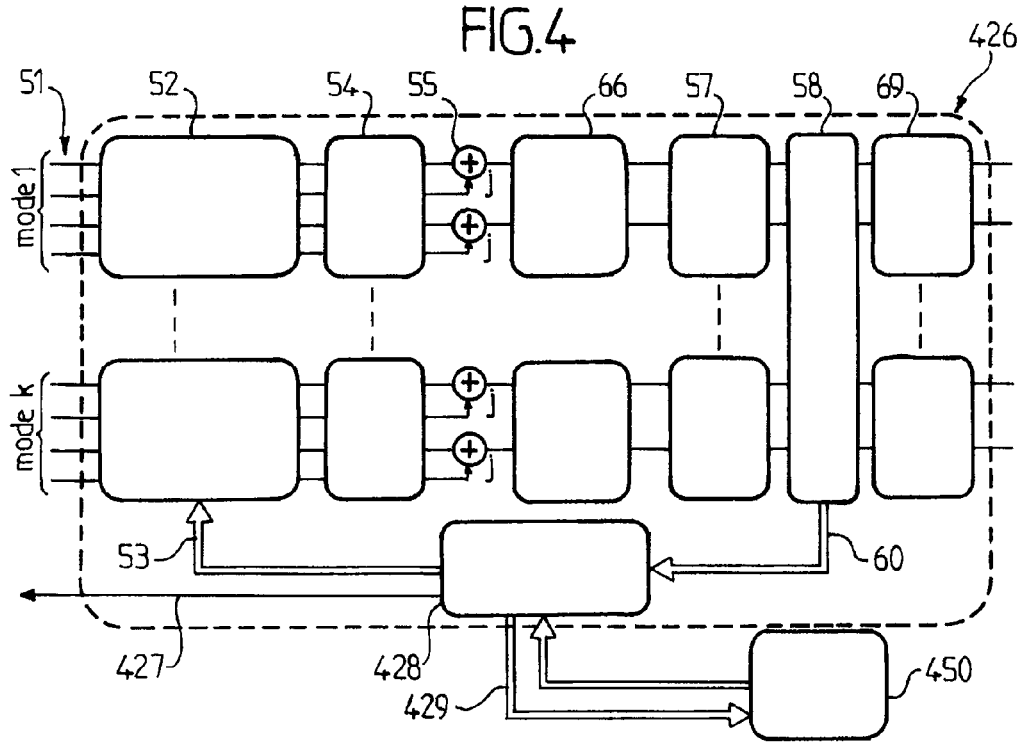
FIG. 5 is a functional representation of a signal processing unit which can be used in the optical receiver of FIG. 2 in accordance with another embodiment.

In the embodiment of FIG. 5, a separate polarization demultiplexing module 66 is provided for each modal signal instead of the shared MIMO module 56. The polarization demultiplexing module 66 can be implemented as a set of adaptive FIR filters in a butterfly structure as known in the art. In addition, a separate symbol identification block 69 is provided for each modal signal instead of the shared symbol identification block 59. Otherwise, the embodiment of FIG. 5 is similar to that of FIG. 4 and need not be further described.

Elements such as the delay control module or the signal processing modules could be e.g. hardware means like e.g. an ASIC, or a combination of hardware and software means, e.g. an ASIC and an FPGA, or at least one microprocessor and at least one memory with software modules located therein.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

TABLE 1

Length of SMF in meters in adjustable delay line 240

| 1st switch | 2nd switch | 3rd switch | 4th switch |
|---|---|---|---|
| 0 | 0 | 0 | 0 |
| 6.25 | 25 | 100 | 400 |
| 12.5 | 50 | 200 | 800 |
| 18.75 | 75 | 300 | 1200 |

TABLE 2

Extract from look-up table in database 50

| Span Index | Length [km] | Mode | Delay to LP01 [ns/km] |
|---|---|---|---|
| 1 | 50 | LP01 | 0 |
| 1 | 50 | LP11 | 4.25 |
| 1 | 50 | LP21 | 7.51 |
| 1 | 50 | LP02 | 6.32 |
| 6 | 80 | LP01 | 0 |
| 6 | 80 | LP11 | 2.5 |
| 5 | 50 | LP01 | 0 |
| 5 | 50 | LP11 | 4.25 |
| 5 | 50 | LP21 | 7.53 |
| 5 | 50 | LP02 | 6.28 |
| 9 | 60 | LP01 | 0 |
| 9 | 60 | LP11 | 4.22 |
| 9 | 60 | LP21 | 7.54 |
| 9 | 60 | LP02 | 6.31 |

The invention claimed is:

1. An optical receiver for multimode communications, comprising:
a mode demultiplexer having an input and a plurality of output lines, the input being adapted to receive an optical signal having a plurality of modulated modal components, wherein each of the plurality of modulated modal components is coupled into one of the plurality of output lines;
a plurality of independently adjustable optical delay devices, wherein each of the independently adjustable optical delay devices is connected to one of the plurality of output lines;
a plurality of coherent optical detectors producing a plurality of electrical digital signals, wherein each of the plurality of coherent optical detectors is connected to one of the plurality of independently adjustable optical delay devices; and
a signal processing device adapted to process the plurality of electrical digital signals.

2. The optical receiver of claim 1, wherein at least one of the plurality of independently adjustable optical delay devices comprises a first delay device having a first plurality of optical fibers wherein each optical fiber has a different length and wherein one of the plurality of modulated modal components is substantially coupled into a selected one of the first plurality of optical fibers.

3. The optical receiver of claim 2, wherein the different lengths of the first plurality of optical fibers are successive integer multiples of a reference length.

4. The optical receiver of claim 2, wherein the first plurality of optical fibers are single mode optical fibers.

5. The optical receiver of claim 2, wherein at least one of the plurality of independently adjustable optical delay devices comprises a second delay device having a second plurality of optical fibers wherein each optical fiber has a different length and wherein one of the plurality of modulated modal components from the first plurality of optical fibers is coupled into a selected one of the second plurality of optical fibers.

6. The optical receiver of claim 5, wherein the different lengths of the second plurality of optical fibers are equal to the different lengths of the optical fibers in the first plurality of optical fibers times an integer multiplier.

7. The optical receiver of claim 6, wherein the integer multiplier is equal to a number of optical fibers in the first plurality of optical fibers.

8. The optical receiver of claim 5, wherein the first and second pluralities of optical fibers are single mode optical fibers.

9. An optical receiver for multimode communications, comprising:
a mode demultiplexer having an input and a plurality of output lines, the input being adapted to receive an optical signal having a plurality of modulated modal components, wherein each of the plurality of modulated modal components is coupled into one of the plurality of output lines;
a plurality of independently adjustable optical delay devices, wherein each of the independently adjustable optical delay devices is connected to one of the plurality of output lines;
a plurality of coherent optical detectors producing a plurality of electrical digital signals, wherein each of the plurality of coherent optical detectors is connected to one of the plurality of independently adjustable optical delay devices;
a signal processing device adapted to process the plurality of electrical digital signals; and
a delay control module that
adjusts each of the plurality of independently adjustable optical delay devices to provide a coarse compensation delay for each of the plurality of modulated modal components, wherein the coarse compensation delay compensates a difference between a propagation time of the modulated modal component and a propagation time of a reference.

10. The optical receiver of claim 9, wherein the delay control module determines the coarse compensation delay for each of the plurality of modulated modal components using information from a data repository.

11. The optical receiver of claim 10, wherein the data repository comprises modal delay data and transmission length data.

12. The optical receiver of claim 10, wherein the data repository comprises transmission length data and modal delay data corresponding to a plurality of links of an optical network in which the optical receiver is installed, wherein the delay control module retrieves the length data and the modal delay data as a function of a link identifier of a multimode link.

13. The optical receiver of claim 9, wherein the delay control module
determines a residual delay for each of the plurality of modulated modal components at one of the plurality of coherent optical detectors,
adjusts each of the plurality of adjustable optical delay devices to provide a residual delay compensation for each of the plurality of modulated modal components, and
updates a data repository using the residual delay.

14. The optical receiver of claim 13, wherein the delay control module updates a data repository using the residual delay.

15. The optical receiver of claim 9, wherein the delay control module adjusts each of the plurality of adjustable optical delay devices corresponding to a residual delay determined based on optimizing a cross-correlation function between a first digital stream recovered from a first modulated modal component and a second digital stream recovered from a second modulated modal component, wherein both modulated modal components were originally modulated with a same learning sequence.

16. The optical receiver of claim 15, wherein the delay control module updates a data repository using the residual delay.

17. The optical receiver of claim 9, wherein the signal processing device comprises an adjustable digital delay line that delays a digital signal component resulting from at least one of the plurality of modulated modal components, wherein the delay control module adjusts the adjustable digital delay line as a function of a residual delay determined for the at least one modulated modal component.

18. An optical receiver for multimode communications, comprising:
    a mode demultiplexer having an input and a plurality of output lines, the input being adapted to receive an optical signal having a plurality of modulated modal components, wherein each of the plurality of modulated modal components is coupled into one of the plurality of output lines;
    a plurality of independently adjustable optical delay devices, wherein each of the independently adjustable optical delay devices is connected to one of the plurality of output lines;
    a plurality of coherent optical detectors producing a plurality of electrical digital signals, wherein each of the plurality of coherent optical detectors is connected to one of the plurality of independently adjustable optical delay devices;
    a signal processing device adapted to process the plurality of electrical digital signals; and
    a delay control module that adjusts each of the plurality of independently adjustable optical delay devices to provide a coarse compensation delay for each of the plurality of modulated modal components, wherein the coarse compensation delay compensates a difference between a propagation time of the modulated modal component and a propagation time of a reference, and wherein at least one of the plurality of independently adjustable optical delay devices comprises a first delay device having a first plurality of optical fibers wherein each optical fiber has a different length and wherein one of the plurality of modulated modal components is substantially coupled into a selected one of the first plurality of optical fiber.

19. The optical receiver of claim 18, wherein at least one of the plurality of independently adjustable optical delay devices comprises a second delay device having a second plurality of optical fibers wherein each optical fiber has a different length and wherein one of the plurality of modulated modal components from the first plurality of optical fibers is substantially coupled into a selected one of the second plurality of optical fibers.

20. The optical receiver of claim 19, wherein the signal processing device comprises an adjustable digital delay line that delays a digital signal component resulting from at least one of the plurality of modulated modal components, wherein the delay control module adjusts the adjustable digital delay line as a function of a residual delay determined for the at least one modulated modal component.

* * * * *